US012486818B2

(12) United States Patent
Sultana et al.

(10) Patent No.: US 12,486,818 B2
(45) Date of Patent: Dec. 2, 2025

(54) GAS TURBINE FOR TWIN-ROTOR AIRCRAFT (71) Applicant: SAFRAN AIRCRAFT ENGINES, Paris (FR)

(72) Inventors: Patrick Sultana, Moissy-Cramayel (FR); Olivier Renon, Moissy-Cramayel (FR); Laurent Cédric Zamai, Moissy-Cramayel (FR); Clément Charles Jérémy Coiffier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/437,297

(22) PCT Filed: Mar. 6, 2020

(86) PCT No.: PCT/FR2020/000051
§ 371 (c)(1),
(2) Date: Sep. 8, 2021

(87) PCT Pub. No.: WO2020/183074
PCT Pub. Date: Sep. 17, 2020

(65) Prior Publication Data
US 2022/0178331 A1 Jun. 9, 2022

(30) Foreign Application Priority Data
Mar. 8, 2019 (FR) ........................ 1902398

(51) Int. Cl.
*F02K 3/072* (2006.01)
*B64D 27/10* (2006.01)
(52) U.S. Cl.
CPC .............. *F02K 3/072* (2013.01); *B64D 27/10* (2013.01); *F05D 2220/323* (2013.01);
(Continued)

(58) Field of Classification Search
CPC ................ F02K 3/072; F05D 2250/44; F05D 2220/323; F05D 2220/36; F05D 2260/30;
(Continued)

(56) References Cited

U.S. PATENT DOCUMENTS 3,094,309 A * 6/1963 Hull, Jr. ................... F01D 5/06
416/198 A
5,131,813 A * 7/1992 Przytulski ............. F01D 25/246
416/220 R
(Continued)

FOREIGN PATENT DOCUMENTS

EP 0 356 305 A1 2/1990
EP 3 015 714 A1 5/2016
(Continued)

OTHER PUBLICATIONS

English translation of Written Opinion mailed Sep. 11, 2020, issued in corresponding International Application No. PCT/FR2020/000051, filed Mar. 6, 2020, 5 pages.
(Continued)

*Primary Examiner* — Courtney D Heinle
*Assistant Examiner* — Jesse M Prager
(74) *Attorney, Agent, or Firm* — CHRISTENSEN O'CONNOR JOHNSON KINDNESS PLLC (57) ABSTRACT

A turbine includes a first rotor and a second rotor that can rotate in opposite directions and are interleaved. The turbine further includes a ring to which abradable material is secured, the ring, unsegmented, extending between the first impellers of the first rotor and the second rotor, over a sector of between 350 and 360°, and, axially between an upstream end and a downstream end of the ring, the ring is held with the second rotor.

9 Claims, 5 Drawing Sheets (52) U.S. Cl.
CPC ...... *F05D 2220/36* (2013.01); *F05D 2250/44* (2013.01); *F05D 2260/30* (2013.01)

(58) Field of Classification Search
CPC ........ F01D 11/00; F01D 11/12; F01D 11/122; F01D 5/03; F01D 21/045; F02C 3/067; B64D 27/10
See application file for complete search history.

(56) References Cited

U.S. PATENT DOCUMENTS

| | | | | |
|---|---|---|---|---|
| 5,131,814 | A * | 7/1992 | Przytulski | F01D 5/3007 |
| | | | | 416/193 A |
| 5,197,281 | A * | 3/1993 | Przytulski | F02K 3/072 |
| | | | | 415/174.4 |
| 5,816,776 | A * | 10/1998 | Chambon | F01D 11/001 |
| | | | | 415/174.4 |
| 7,048,496 | B2 * | 5/2006 | Proctor | F01D 1/26 |
| | | | | 415/115 |
| 8,667,777 | B2 * | 3/2014 | Gallet | F02K 3/072 |
| | | | | 60/268 |
| 2013/0287551 | A1 * | 10/2013 | Del Donno | F01D 11/02 |
| | | | | 415/170.1 |
| 2018/0258858 | A1 | 9/2018 | Moniz et al. | |
| 2019/0085712 | A1 * | 3/2019 | Wesling | F01D 11/001 |

FOREIGN PATENT DOCUMENTS

| | | | |
|---|---|---|---|
| FR | 2 942 273 A1 | 8/2010 | |
| WO | WO-2016189222 A1 * | 12/2016 | ............. F01D 11/08 |

OTHER PUBLICATIONS

International Preliminary Report on Patentability mailed Aug. 25, 2021, issued in corresponding International Application No. PCT/FR2020/000051, filed Mar. 6, 2020, 6 pages.

International Search Report mailed Sep. 11, 2020, issued in corresponding International Application No. PCT/FR2020/000051, filed Mar. 6, 2020, 5 pages.

Written Opinion mailed Sep. 11, 2020, issued in corresponding International Application No. PCT/FR2020/000051, filed Mar. 6, 2020, 5 pages.

* cited by examiner

GAS TURBINE FOR TWIN-ROTOR AIRCRAFT

FIELD OF THE DISCLOSURE

The field of the present disclosure is that of gas turbomachines for aircraft, and in particular turbofans or turbofan engines for aeronautics.

As a preamble, it is stated at the outset that:
- any turbomachine and/or turbine referred to herein typically has a common X-axis substantially parallel to which gas flows from upstream to downstream, this axis being the axis of rotation of any rotor of that turbomachine or turbine,
- "outer" and "inner" refer to positions radial to the X-axis; outer is that which is further from the X-axis and inner is that which is closer to it, and
- "circumferentially" (or "tangentially") means: around the X axis, to extend around it.

A gas turbine engine for aircraft, such as a turbofan-which is a dual casing, dual gas flow engine—comprises a fan which is often driven directly by, and axially disposed upstream of, a low-pressure turbine (LP turbine hereafter), which is located downstream of a high pressure turbine (HP turbine hereafter). A combustion chamber is interposed axially between the downstream HP turbine and an upstream LP (low pressure) compressor, downstream of which the turbomachine also includes an HP (high pressure) compressor. This configuration with a fan driven directly by the LP turbine has the disadvantage that the fan rotates at the same speed as the LP turbine. However, to achieve good specific fuel consumption and low noise levels, the fan should be rotated as slowly as possible, while adapting the blade profile to maintain a high airflow and speed and therefore the desired thrust level.

In addition to a solution consisting of placing a gearbox on the shaft that connects the fan and the LP turbine, it has already been proposed, as an alternative turbofan engine, that, since the turbine extends around an axis (X), it comprises:
- a first rotor comprising first moving wheels (or impellers), and
- a second rotor comprising second moving wheels (or impellers), the first and second rotors being rotatably mounted about the axis (X), the first rotor and the second rotor being configured to rotate in opposite directions, at least some of the second impellers being axially interposed between at least some of the first impellers.

Thus, for example in FR2942273, the LP turbine comprises a first rotor, part of which rotates axially about the second impellers. The fan is driven by the second rotor via the second turbine shaft and by the first rotor via the first turbine shaft, which rotates in the opposite direction to the second shaft, a counter-rotating turbine having the advantage of having a small footprint to perform the same function as a conventional turbine.

Among the problems to which the disclosure seeks to provide a solution, the following may be noted:
- what will be considered as the second rotor is a critical part that must be preserved,
- if possible, this second rotor must be protected from damage that could be caused by the release of blades with which the rotors are equipped, or of parts of these blades, particularly if such releases are not quickly detected
- the retention of the blades of the first rotor must be ensured.

SUMMARY

A proposed solution to some or all of the above problems is that the above known gas turbine is such that it further comprises a ring to which abradable material is secured,
- the ring extending about the axis of rotation, between the (at least one of the) first impellers and the second rotor, and
- axially between an upstream end and a downstream end of the ring, the ring being held with the second rotor.

Thus, in other words, the turbine comprises a ring to which abradable material is secured, the ring extending around one of the first impellers with which the abradable material is to cooperate.

In effect, the abradable material is interposed between the ring and the one of the first impellers, around that impeller.

The abradable material is therefore fixed with respect to the ring; however, one of the first impellers is movable (rotates about the X axis) with respect to the abradable material, By coming into contact with the abradable material, during the rotation of the turbine, the first mobile wheel cooperates with it, or engages it.

This helps to retain the blades of the first impeller, without damaging a (radially outer) part of the second rotor. Indeed, on a conventional turbine (i.e. one with only an inner rotor, without an outer rotor, but with an outer stator instead) any such ring is secured to the outer stator which is typically a fixed turbine casing, which then performs the retention function: the ring is in this case only a complement in the retention. As a result, conventional turbine rings are in the form of sectors, which facilitates their manufacture and mechanical strength. In the counter-rotating turbine of the disclosure, the rings are fixed with the second rotor. Therefore, the retention of the blades of the first rotor (whose blades may typically be—radially—inner with respect to a part of the second rotor which surrounds them) must be ensured by one or more solid, resistant rings, in order to protect the second rotor (its aforementioned surrounding part). It may be favourably chosen that the ring extends over an angular sector of between 35° and 360°.

Thus, a ring manufactured in an axisymmetric manner and therefore over 360°, which cannot open under the impact of a released blade and is optimal for retention, may be preferred. However, it is also possible to choose a ring that is split between 350° and less than 360°, in order to facilitate the assembly of the ring as well as maintenance.

In addition, with an axial positioning as mentioned above of its retention(s) on the second rotor, the ring will have some capacity for axial expansion, when the turbine is running.

To facilitate this, it is further proposed that axially, the holding of the ring with the second rotor is located closer to the centre of the ring than to the upstream and downstream ends. Axially the ring will be held with the second rotor by a rotational coupling which may include a dog clutch coupling (see below).

With such upstream and downstream ends being axially (and preferably radially) fixable only by the rotational coupling, the ring will have a favourable freedom of deformation, without real constraint, when the turbine is operating.

And keeping the ring axially close to its centre will promote more accurate ring balancing and less vibration in the turbine.

According to another feature, it is also proposed that, for its holding with the second rotor, the ring has a central cylindrical bearing that extends axially at the centre of the ring. This position allows the ring to be balanced efficiently and easily during manufacture and assembly.

Favourably, the cylindrical bearing will be shrunk into the second rotor.

The advantage is a very precise centring of the ring on the second rotor.

It is also proposed that:
the ring has two first axial cylindrical surfaces, respectively upstream and downstream, located one further upstream than the other, at the outer periphery of the ring,
the second rotor has two second axial cylindrical surfaces, respectively upstream and downstream, located radially opposite the first upstream and downstream cylindrical surfaces, respectively, at the inner periphery of a portion of the second rotor, and
a radial clearance is established, during normal operation of the turbine, between the first and second cylindrical surfaces respectively of the ring and of the portion of the second rotor.

This, in turn, ensures that the operating clearances, and in particular the differential expansions, between the abradable material and the blades of the first rotor are well controlled.

In addition, and specifically for counter-rotating turbines, the precise centring of the ring on the second rotor also allows for more precise balancing and therefore less vibration in the turbine.

According to yet another feature, it is proposed that, for an axial stop of the ring and for its holding with the second rotor, a rotational coupling is established between the ring and the second rotor.

Preferably, this rotational coupling will be established in the axially central part of the ring.

Thus, an effective axial stop and a secure, and again balanced, attachment (securement) in terms of mechanical stress will be provided between the ring and the second rotor.

To complete this rotational connection for the same purpose, it is also proposed that the rotational coupling includes an axial stop between at least one radially outwardly projecting protrusion on the ring and at least one cooperating groove on the second rotor.

Favourably, the rotational coupling will include a dog clutch coupling.

This will allow a translational stop close to the aforementioned centring of the ring and will help to reduce the axial stresses in the ring. This is a solution that complements the non-sectorised ring.

In addition, a circumferential (also called tangential) bearing will be established between the ring and the vanes, directly downstream of the ring; typically adjacent to the aforementioned first and second downstream axial cylindrical surfaces, if any. To this end, a rotational coupling means via pin and mortise may connect the ring to the axially adjacent second impeller.

This should:
allow the ring to be stopped in rotation (about the X axis), in an effective manner that is fairly easy to produce and install, and
prevent it from becoming un (dog) clutched.

Preferably, the abradable material will be presented circumferentially as a succession of ring sectors.

This will facilitate manufacture, mounting of the abradable material on the ring and replacement thereof.

According to yet another feature, there is also proposed herein a gas turbine engine for aircraft, the turbine engine having an upstream inlet, where gas enters, and a downstream outlet, where gas exits, the turbine engine comprising:
the aforementioned turbine, which is an LP turbine, with all or part of its characteristics, and
an HP turbine located upstream of the LP turbine.

DETAILED DESCRIPTION

The following refers to implementations which are presented as examples only.

Figure 1:
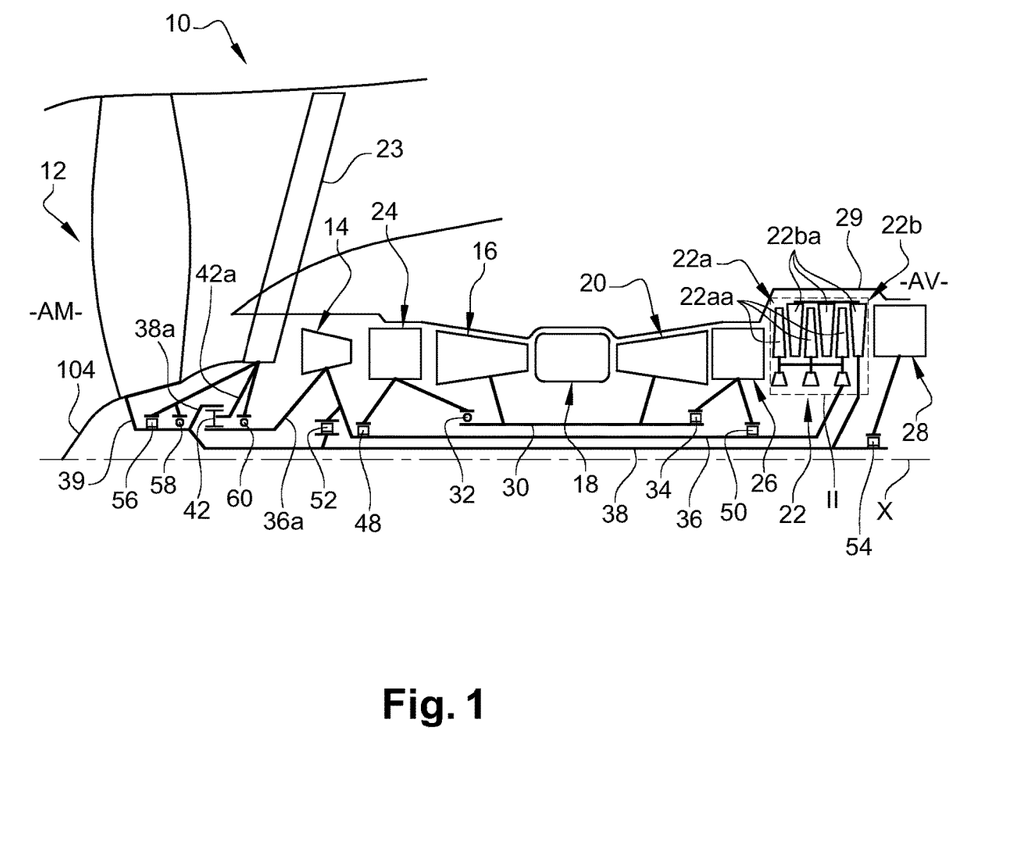
FIG. 1 shows a schematic axial cross-sectional view of a possible implementation of a contra-rotating turbomachine according to the disclosure.

The diagram in FIG. 1 therefore illustrates a counter-rotating, geared turbomachine 10 for an aircraft.

This turbomachine 10 comprises from upstream to downstream, in the direction of gas flow axially from upstream (US) to downstream (DS), a fan 12, a low-pressure compressor 14, a high-pressure compressor 16, an annular combustion chamber 18, a high-pressure turbine 20 and a counter-rotating turbine 22, at lower pressure (also called LP).

Reference 23 refers to an inlet casing located between the fan 12 and the compressor 14. Reference 24 refers to an intermediate casing between compressors 14 and 16, and reference 26 refers to a turbine casing (TVF type) between turbines 20 and 22. Reference 28 refers to an exhaust casing (TRF type).

The high-pressure turbine rotor 20 rotates the high-pressure compressor rotor 16 via a high-pressure shaft 30, which is centred and guided in rotation by bearings, such as an upstream bearing 32 and a downstream bearing 34.

The counter-rotating turbine 22 comprises a first rotor 22*a* having wheels 22*aa* (also known as first impellers) configured to rotate in a first direction of rotation and connected to a first turbine shaft 36, and a second rotor 22*b* having wheels 22*ba* (also known as second impellers) configured to rotate in an opposite direction of rotation and connected to a second turbine shaft 38. The wheels 22ba are axially interposed between the wheels 22aa. The first and second rotors 22a, 22b are surrounded by a casing 29, a downstream end of which comprises a flange for attachment (securement) to the exhaust casing 28.

The first shaft 36 extends in the example axially within the shaft 30 and rotates the low-pressure compressor rotor 14. The first shaft 36 is further coupled to an input shaft 36a which is meshed with a sun or planet gear of a mechanical gearbox 42, for example with an epicyclic gear train. The input shaft 36a is thus rotationally fixed to the shaft 36.

The second shaft 38 extends in the example axially within the shaft 36 and rotates the fan 12. The second shaft 38 is coupled to a fan casing 39 and to an output shaft 38a which is 5 meshed with the ring gear of the gearbox 42.

The gearbox 42 further comprises satellites meshed with the sun and ring gear respectively and carried by a satellite holder 42a. The satellite holder may be fixed or movable. In an epicyclic gearbox it is mobile, in a planetary gearbox it is fixed. The satellite holder 42a may or may not be fixed to the input casing 23.

The first shaft 36 is centred and guided upstream by a bearing 48 mounted between the first shaft 36 and the intermediate casing 24, and downstream by a bearing 50 mounted between the first shaft 36 and the turbine casing 26.

The second shaft 38 is centred and guided upstream by a bearing 52 mounted between the second shaft 38 and the first shaft 36, and downstream by a bearing 54 shown between the second shaft 38 and the exhaust casing 28.

The fan shaft 39 and the output shaft 38a are guided by an upstream bearing 56 and a downstream bearing 58. These bearings 56, 58 are located upstream of the gearbox 42, between, firstly, the fan shaft 39 and the output shaft 38a, and secondly, the inlet casing 23. Downstream of the gearbox 42, a bearing 60 guides the input shaft 36a in rotation and is mounted between this shaft and the input casing 23.

Both the impellers 22aa and 22ba comprise vanes on the outer periphery, referenced 221 and 222 respectively.

Figure 2:
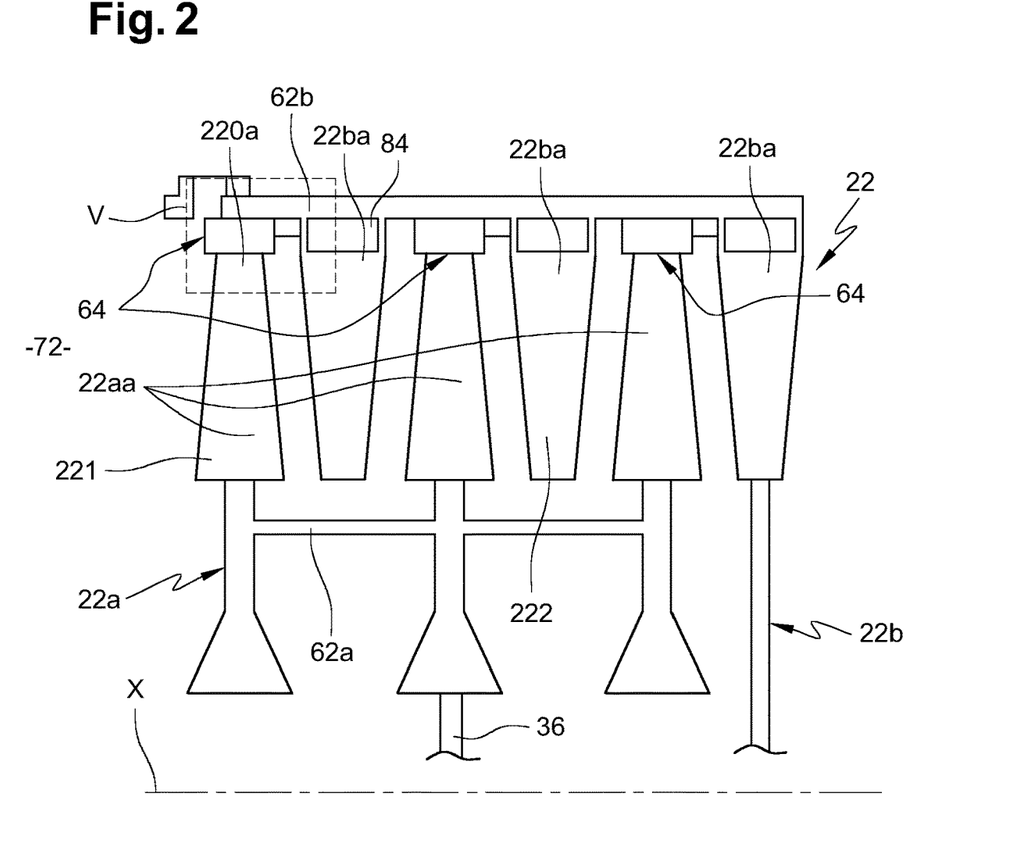
FIG. 2 shows an enlarged diagram of the first and second rotors; zone II FIG. 1.

From the diagram in FIG. 2, it is best seen that the impellers 22aa are coupled by a portion 62a of the first rotor 22a to rotate together, and the impellers 22ba are coupled by a portion 62b of the second rotor 22b to also rotate together.

The portions 62a of the first rotor 22a and 62b of the second rotor 22b may each be defined by an annular portion, integral through 360° about the X axis.

The portion 62b surrounds the wheels 22ba, but also the wheels 22aa, as well as the portion 62a.

Figure 6:
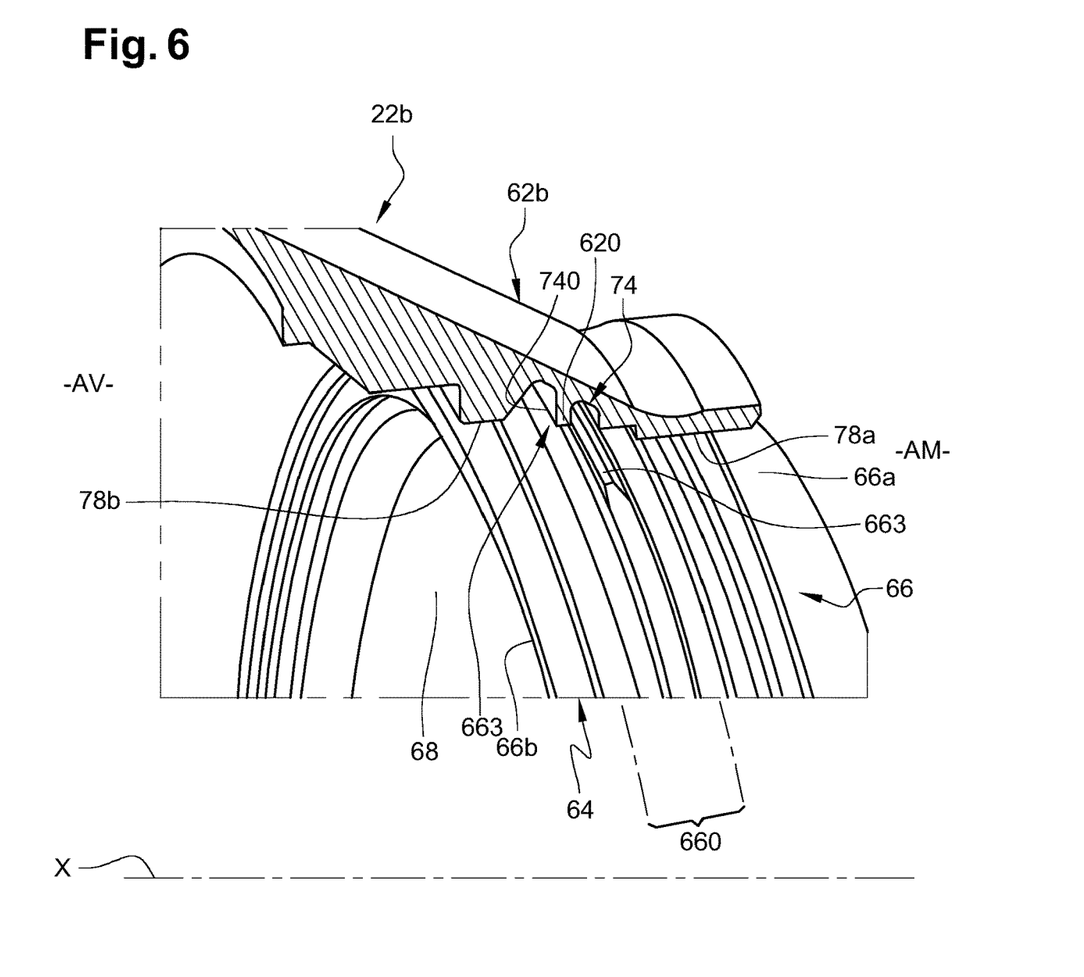
FIG. 6 represents a perspective view with tearing of this zone V.

An area of part 62b is best seen in FIG. 6.

In accordance with the disclosure, at least one assembly 64 (referred to as such in particular in FIG. 2) comprising at least one ring 66 extending circumferentially over a sector of between 35° and 360° and to which abradable material 68 is fixed (see FIGS. 4-6) is interposed radially between the part 62b and the free outer ends 220a of the blades of the wheels 22aa.

At the outer periphery, the impeller blades 22aa have knife edge sealings 70, at least one per blade.

For sealing in the gas stream 72 where the blades 221 and 222 extend, the knife edge sealings (70) come into contact with the abradable material 68 during the rotation of the turbine 22.

Figure 3:
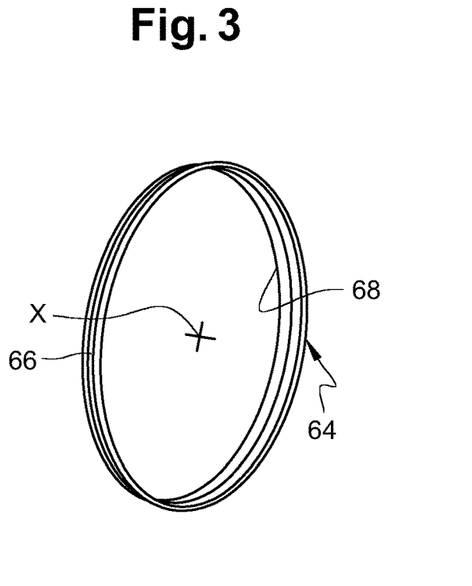
FIG. 3 represents a schematic of an assembly comprising a ring (66 hereinafter) to which abradable material (68 hereinafter) is secured.
Figure 4:
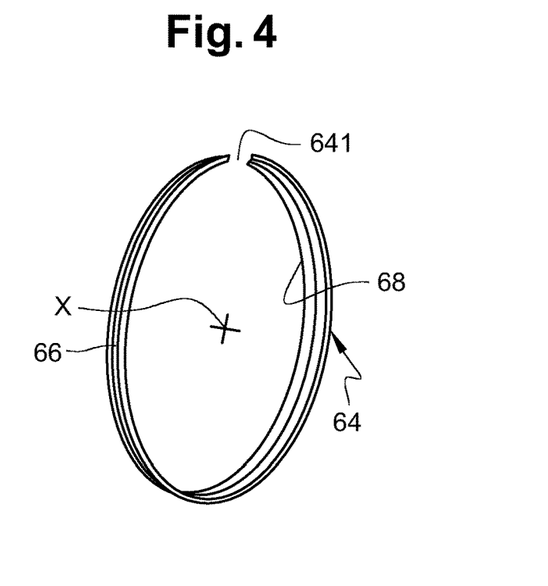
FIG. 4 represents an alternative implementation of the assembly.

The ring 66, which therefore extends around the axis of rotation X, between the first impellers 22aa) and the second rotor 22b, is unsegmented, as can be seen in FIG. 3 or 4.

Figure 5:
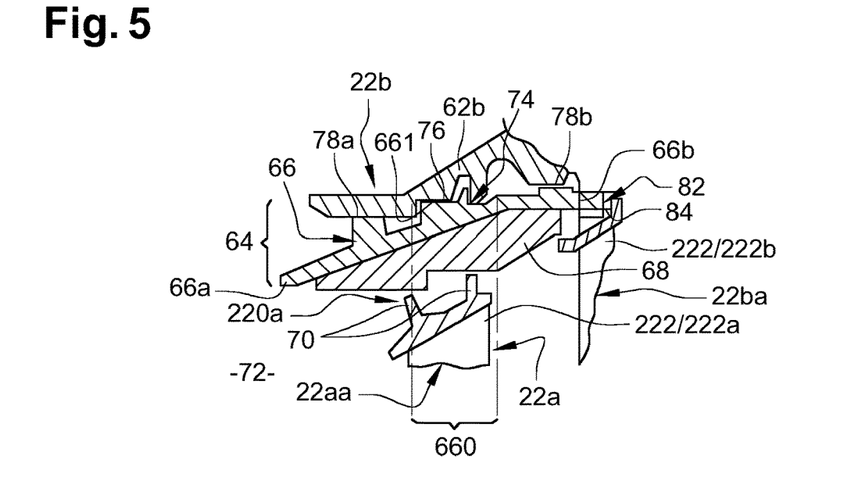
FIG. 5 represents a diagram of a vertical section in zone V of FIG. 2.

In addition, in order to promote the fact that the ring 66 has a certain capacity for axial expansion, when the turbine is operating, it is provided that axially, between an upstream end 66a and a downstream end 66b of the ring, this ring is held on the second rotor 22b (its part 62b), fixed with it; see in particular FIGS. 5-6.

To further promote this, and thus further minimise the stresses due to differential axial expansion between the ring 66 and the second rotor 22b, by ensuring that the upstream and downstream ends of the ring are free to expand axially, it is even proposed that axially. It is even proposed that axially, the holding (the singular does not exclude several holdings) of the ring 66 with the second rotor 22b be located closer to the centre of the ring-see zone 660 FIGS. 5 to 8—than to the upstream and downstream ends 66a and 66b, where the ring will then not be held axially with the second rotor 22b.

Held (engaged) in such a zone 660 axially close to its centre, the ring will be well balanced, and less vibration will be generated in the turbine.

In terms of holding, the following is proposed:
that the ring 66 has a central cylindrical bearing surface 661 located therefore, parallel to the axis X of rotation, substantially at the centre of the ring (see in particular FIGS. 5, 7 and 8).
that a rotational coupling 74 is established between the ring 66 and the second rotor 22b (its part 62b), in the axially central part 660 of the ring (see the same figures).

The central cylindrical bearing surface 661 would thus be present at the outer periphery of the ring, opposite and radially in contact, at a standstill and when the turbine is operating, with a cylindrical support 76 provided, in a complementary inner manner, on the part 62b of the second rotor 22b (see in particular FIGS. 5, 7 and 8), this participating in an efficient and easy implementation, during manufacture and assembly, of the balancing of the ring. Favourably, the cylindrical bearing 661 will be shrunk into the second rotor.

This allows better control of the clearances between the abradable 68 and the sealing elements 70 of the blades of the first rotor 22a, each of which is provided on the outer circumference of a blade platform 222/222a (see FIG. 5) of the first rotor, and which must themselves cooperate on the outer circumference with the abradable 68 then provided (fixed) on the radially facing part 62b of the second rotor 22b.

With the rotational coupling 74, the attachment (securement) will be safe and again balanced in terms of mechanical stress between the ring and the second rotor 22b.

Figure 7:
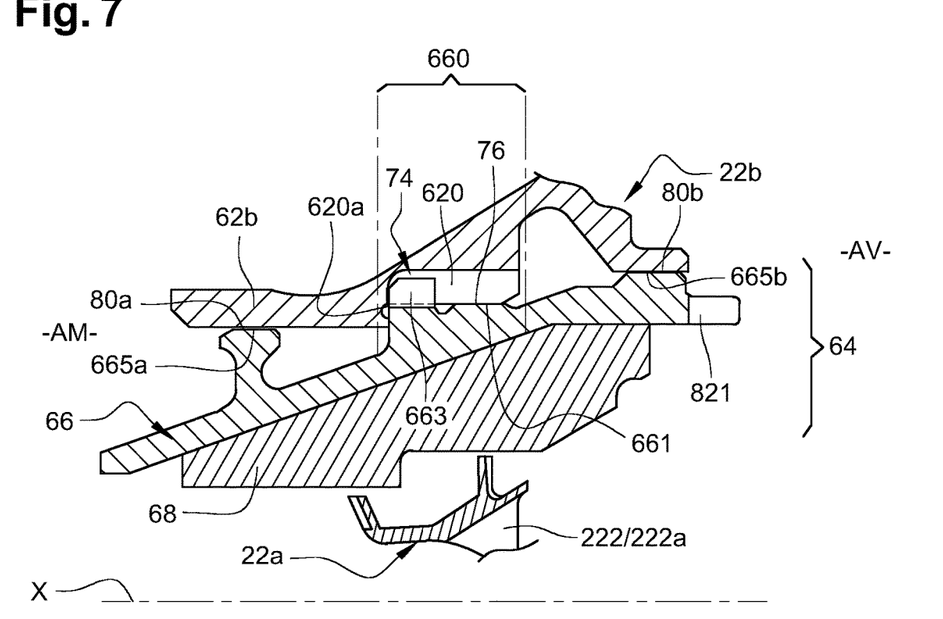
FIG. 7 represents an alternative implementation of the zone V.
Figure 8:
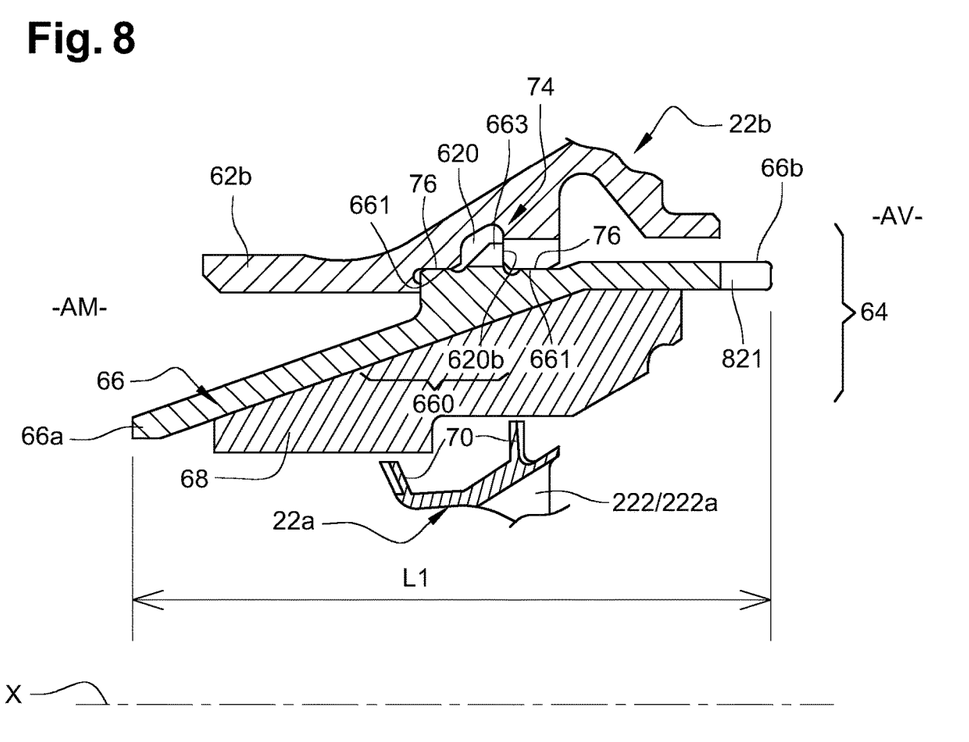
FIG. 8 shows another implementation variant of this zone V.
Figure 9:
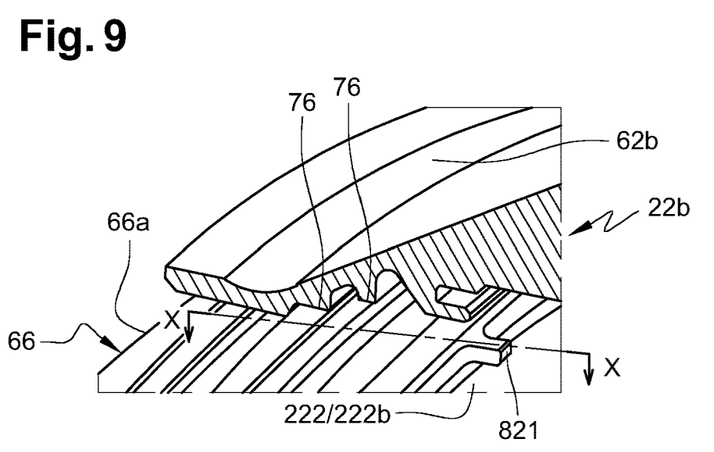
FIG. 9 shows the diagram of FIG. 6, at another point on the circumference.

The rotational coupling 74 may include an axial stop 740 between at least one radially outwardly projecting protrusion 663 on the ring 66 and at least one radial groove 620 on the second rotor portion 62b; see FIGS. 6-8.

Each protrusion 663 may be formed by a tooth, the teeth being circumferentially distributed, in several ring sectors.

Although located in the axially central part 660, the rotational coupling 74, and therefore the cooperating protrusion(s) and groove(s) 663, 620, may be positioned in different ways axially with respect to the centring formed via the cylindrical bearing surface 661 and its cylindrical support 76: just downstream of this centring, as in the solution of FIG. 5, upstream of the centring, as in the solution of FIG. 7, or in the middle of the latter as in the solution of FIG. 8. Thus:
in the solution of FIG. 7 is illustrated a protrusion 663 bearing on the upstream side against an upstream wall 620a of a groove 620, while the centring walls 661,76 are located further downstream, in the solution of FIG. 8 is illustrated a protrusion 663 bearing on the downstream side against a downstream wall 620b of a groove 620, while the centering walls 661,76 are distributed axially adjacent between the upstream and downstream continuities of this rotary coupling 74.

If it is said to be "central", the cylindrical bearing 76 will be located substantially at the centre 660 of the ring: The axial centre of the ring is defined as half (within 15%) of the length L1 (see FIG. 8) between its upstream 66a and downstream 66b ends, including the axial tooth 821 (see below). The axially central portion 660 extends axially on either side of this centre for a length which may be between 10% and 30% of the length L1. Up to about 25% on one side and about 5% on the other may be envisaged, as in FIG. 8 where only at least part of the upstream centering walls 661,76 are located upstream of the middle of the length L1, with the rotational coupling 74 and the downstream part of the centering walls 661,76 being located downstream of this middle.

Advantageously, the rotational coupling 74 will comprise a dog clutch. To this end, the protrusion(s) and groove(s) 663, 620 may be inter-engaged to form a circumferential dog clutch.

WO2016189222 or FR3036433 provides an example of a dog clutch. If there has been shrink fitting of the centring (see above), the shrink fitting will have been adapted to allow relative manual rotation during the dog clutch.

Such a rotational and translational stop close to the above-mentioned centring 76,661 of the ring will in any case help to reduce the axial stresses in the latter.

This is a solution which complements that of the non-sectorised ring 66.

In this respect, FIG. 3 illustrates an assembly 64, including a ring 66, annular over 360° about the X axis, while FIG. 4 illustrates an assembly 64, including a ring 66, annular over 350°, thus presenting itself as a split ring, at 641, on its circumference. Although this allows engagement with circumferential elastic deformation, such a split solution is less secure than the 360° annular, axisymmetric one, which cannot open under the impact of a released blade. The abradable 68 will preferably, in each case, be implemented in sectorised or non-sectorised blocks (not shown), each of which may be conventionally and removably secured to the ring 66, on the inner circumference of the latter.

As shown more particularly in FIGS. 5 and 7, it is also proposed that upstream and downstream supports 78a and 78b be advantageously provided between the ring 66 and the part 62b of the second rotor, in the event of abnormal circumstances, such as blade impact or local overheating. These upstream 78a and downstream 78b supports would not exist in normal operation of the turbine, nor at standstill where a radial clearance would then be present between the respective surfaces referenced 665a, 80a at the upstream end and 665b, 80b at the downstream end, for the ring 66 and the part 62b; see FIG. 7.

Thus, the ring 66 will then have two first axial cylindrical surfaces, respectively upstream 665a and downstream 665b, located one further upstream than the other, at the outer periphery of the ring, and the portion 62b of the second rotor will have two second axial cylindrical surfaces, respectively upstream 80a and downstream 80b, located radially opposite the first upstream and downstream cylindrical surfaces, respectively, at the inner periphery of the portion 62b. This should help to control operating clearances, and in particular axial expansions, between the abradable material 68 and the—sealing elements 70 of the—blades 222 (or 222a, 222b FIG. 5 or 10) of the second rotor.

It should be noted, however, that the centring solution—between the central cylindrical bearing surface 661 and the cylindrical support 76—and the rotational coupling 74 is independent of these functions and may be provided alone on the ring 66, as shown in FIG. 8.

In this solution, only the centring support between the central cylindrical bearing surface 661 and the cylindrical support 76 and the rotational coupling 74 are retained (compared to the above). The axial cylindrical surfaces of upstream support 78a and downstream support 78b in the case of abnormal circumstances as mentioned above are removed.

Figure 10:
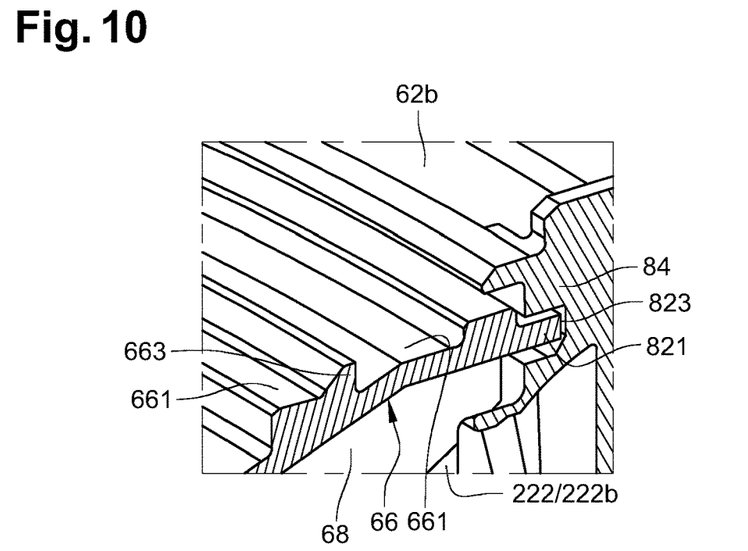
FIG. 10 shows the X-X section of FIG. 9.

In any case, in both cases, there will preferably also be provision for the establishment of at least one circumferential bearing surface (also known as tangential, about the X axis) between the ring 66 and a vane, such as the vane 222b which downstream, in FIG. 5, is axially adjacent to the ring 66 and which is therefore also axially adjacent downstream to the vane 222a whose sealing elements 70 cooperate with the abradable 68; see FIG. 5 or 10. Thus, in 82, a rotational coupling means via spigot and groove connects the ring 66 to the axially adjacent second impeller (22ba).

Figure 11:
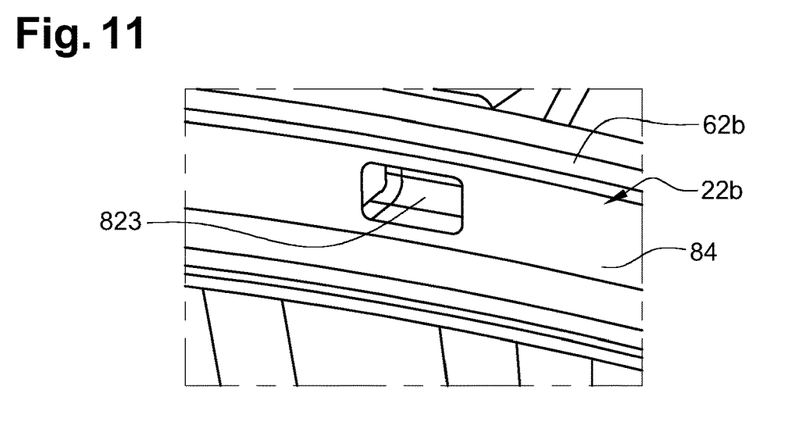
FIG. 11 shows the area around the hollow 823 of FIG. 10.

The circumferential bearing surface 82 (or each of them as there may be several circumferentially and/or when there are several rows of blades on the turbine, as in the example of FIG. 2 where there are three) may be implemented by an axial tooth 821 projecting downstream on the downstream edge, at the downstream end 66b of the ring 66 and engaged rather tightly in a complementary recess 823 formed on the upstream face of an annular connecting part 84 which the blade concerned may have (such as that 222/222b in FIG. 10), for its attachment (securement), at the outer circumference, to the part 62b of the second rotor 22b; see also FIG. 11.

This should, effectively and with relative ease of implementation and assembly, prevent de-clutching and allow each ring 66 to be rotationally arrested with respect to (the connecting ring portion 84 of) the adjacent downstream row of vanes 222a of the first impellers 22aa.

The invention claimed is:

1. A gas turbine for an aircraft, the turbine extending about an axis (X) and comprising:
    a first rotor comprising first impellers and a second rotor comprising second impellers, the first and second rotors being rotatably mounted about said axis (X), the first rotor and the second rotor being configured to rotate in opposite directions, with at least some of the second impellers being axially interposed between at least some of the first impellers; and
    a ring to which an abradable material is secured, the ring extending around one of the first impellers with which the abradable material cooperates, and axially between an upstream end and a downstream end of the ring, wherein the ring is held with the second rotor,
    wherein, for achieving an axial stop of the ring and for holding the ring with the second rotor, a rotational coupling is established between the ring and the second rotor, and
    wherein the rotational coupling includes an axial abutment between a plurality of radially outwardly projecting protrusions on the ring and a plurality of cooperating grooves on the second rotor, and
    wherein the rotational coupling comprises a dog clutch formed by said plurality of radially outwardly projecting protrusions and said plurality of cooperating grooves, inter-engaged with said plurality of radially outwardly projecting protrusions.

2. The turbine according to claim 1, wherein the ring extends over an angular sector of between 350° and 360°.

3. The turbine according to claim 1, wherein, axially, said holding of the ring with the second rotor is located closer to a center of the ring than said upstream and downstream ends.

4. The turbine according to claim 1, wherein, for said holding with the second rotor, the ring has a central cylindrical bearing which extends axially at a center of the ring.

5. The turbine according to claim 4, wherein the cylindrical bearing of the ring is shrunk into the second rotor.

6. The turbine according to claim 1, wherein:
the ring has two first axial cylindrical surfaces, respectively upstream and downstream, located one further upstream than the other, at the outer periphery of the ring,
the second rotor has two second axial cylindrical surfaces, respectively upstream and downstream, located radially opposite the first upstream and downstream cylindrical surfaces, respectively, at an inner periphery of a portion of the second rotor, and
a radial clearance is established, during normal operation of the turbine, between the first and second cylindrical surfaces respectively of the ring and of said portion of the second rotor.

7. The turbine according to claim 1, wherein the rotational coupling is located at an axially central portion of the ring.

8. The turbine according to claim 1, wherein a mortise and tenon rotational coupling means connects the ring to the second impeller, which is axially adjacent thereto.

9. A turbojet engine, the turbojet engine having an upstream inlet, into which gas enters, and a downstream outlet, from which gas exits, the engine comprising:
the turbine according to claim 1, which is a low-pressure turbine, and
a high-pressure turbine located upstream of the low-pressure turbine.

* * * * *